US005151997A

United States Patent [19]

Bailey et al.

[11] Patent Number: 5,151,997

[45] Date of Patent: Sep. 29, 1992

[54] COMPUTER WITH ADAPTABLE VIDEO CIRCUITRY

[75] Inventors: Robert L. Bailey, San Jose; Brian D. Howard, Menlo Park, both of Calif.

[73] Assignee: Apple Computer, Inc., Cupertino, Calif.

[21] Appl. No.: 392,094

[22] Filed: Aug. 10, 1989

[51] Int. Cl.[5] .................... G06F 7/00

[52] U.S. Cl. .................... 395/800; 364/927.2; 364/927.4; 364/933; 364/926.92; 364/939.1; 364/DIG. 2; 340/750; 340/799

[58] Field of Search ... 364/200 MS File, 900 MS File, 364/521, 518; 340/750, 799, 825.5; 395/800, 162, 164

[56] References Cited

U.S. PATENT DOCUMENTS

| | | | |
|---|---|---|---|
| 4,079,458 | 3/1978 | Rider et al. | 364/900 |
| 4,117,469 | 9/1978 | Levine | 340/324 AD |
| 4,149,145 | 4/1979 | Hartke et al. | 340/750 |
| 4,486,856 | 5/1982 | Heckel et al. | 364/900 |
| 4,511,965 | 4/1985 | Rajaram | 364/200 |
| 4,755,810 | 7/1988 | Knierim | 340/750 |
| 4,757,312 | 7/1988 | Asai et al. | 340/750 |
| 4,769,637 | 9/1988 | Forrester et al. | 340/750 |
| 4,783,652 | 11/1988 | Lumelsky | 340/750 |
| 4,809,166 | 2/1989 | Cooper | 364/200 |
| 4,862,150 | 8/1989 | Katsura et al. | 340/703 |
| 4,882,683 | 11/1989 | Rupp et al. | 340/750 |
| 5,001,652 | 3/1991 | Thompson | 364/521 |

FOREIGN PATENT DOCUMENTS 2235314 2/1991 United Kingdom .

OTHER PUBLICATIONS

Examiner's Search Report; M. J. Davis; U.K. Patent Office; Application No. 9016822.0; May 21, 1991.

*Primary Examiner*—Thomas C. Lee
*Assistant Examiner*—William M. Treat
*Attorney, Agent, or Firm*—Blakely, Sokoloff, Taylor & Zafman

[57] ABSTRACT

A computer which provides a video signal for display is disclosed. The computer has a central processing unit (CPU) which executes a program to provide video data for a display which is organized as a matrix of pixel elements, each pixel element being represented by a certain number of bits of video data stored within a random-access memory (RAM) in the computer. A video integrated circuit is coupled to the RAM to provide N bits of video data per pixel to the display at a dot clock rate consistent with the requirements of the display. This video circuit, rather than having its own video RAM, shares the system memory (i.e., RAM) with the CPU. A memory controller arbitrates access to the RAM between the CPU and the video circuit in a manner that denies access to the RAM by the CPU whenever the video circuit is reading video data from the RAM.

All of the video circuitry is incorporated on a single printed circuit board with the rest of the computer circuitry, thereby obviating the need for a separate video card with its own expensive video RAM, and permitting access to the video data at a substantially faster rate than that of past systems.

19 Claims, 6 Drawing Sheets

10
RAM 11
RAM CONTROL
52
MEMORY DECODER UNIT (MDU) 12
CPU 13
FREQ A
FREQ B
FREQ C
18
19
20
37
38
39
VIDEO DATA
21
32
RBV
22
VID. LD
23
VID. REQ
24
VID. RES
25
RAM BASED VIDEO UNIT (RBV) 14
8
DOT. CLK
CBLANK
CSYNC
HSYNC
VSYNC
MON. ID
VID. OUT
29
30
31
33
34
35
VDAC 26
MONITOR 27
R,G,B
36
3

COMPUTER WITH ADAPTABLE VIDEO CIRCUITRY

CROSS REFERENCE TO RELATED APPLICATIONS

This application is related to copending application entitled "Computer with Self-Configuring Video Circuitry". Ser. No. 07/392,111, filed Aug. 10, 1989, now abandoned, which application is assigned to the assignee of the present invention.

FIELD OF THE INVENTION

This invention relates to the field of video circuitry associated with digital computer displays; in particular, for microprocessor-based computer systems which provide a video signal for display on a CRT monitor.

BACKGROUND OF THE INVENTION

Today, microprocessor-based personal computers (PCs) find wide application in education, science, business and the home. As the use of personal computers becomes more widespread, the demand for faster and more flexible video features has also expanded. Consequently, computer manufacturers are diligently searching for ways to increase the performance and adaptability of video display systems while reducing the cost to the consumer.

In general, the internal architecture of the personal computer is organized such that the central processing unit (CPU) is housed on a printed circuit board which also contains system memory and supporting logic devices. This board is commonly referred to as a "motherboard". In the past, if users desired video graphics features, they necessarily had to purchase a separate video card which was designed to be plugged into a slot coupled to the motherboard across a connective bus interface. This card would contain dual-ported video random-access memories (VRAMs) which would be used to store the video display data later output to the display device (i.e., a monitor). The video card would have its video timing circuitry configured for a particular type of monitor; that is, the card could only be used with that type of monitor and no other. This past approach was typical of machines such as the original Macintosh II series computers, and is still in wide use today.

The use of a separate video card, however, has several important disadvantages. First of all, there is a sacrifice in speed performance since signals from the CPU must be transmitted across a slower communications bus to the separate video card. For example, in the Macintosh II family of computers, a "NUBUS" bus (NUBUS TM is a trademark of Texas Instruments Corporation) provides the connection between the CPU and the video card. This results in a significant loss in CPU bandwidth since the CPU cannot process information (e.g., dynamically update the video data) during the time it is transmitting a video word across the bus to the video card—a transfer which, in the case of a NUBUS, typically takes 5 CPU clock cycles plus about 700 nanoseconds (ns).

Secondly, the separate video card approach is very costly. Besides the cost of the extra board and connectors, the user must also sacrifice one of the available slots connected to the NUBUS. Moreover, VRAMs are about twice as expensive as the normal computer system RAM and a large amount of VRAM needs to be incorporated on the separate video card. VRAM memory is available only in certain sizes, which often do not match the requirements of a particular display. In many cases, a large portion of the memory space is simply "wasted" because the computer system cannot make effective use of it. In addition, a separate video card generates a considerable amount of extra heat due to the dissipation of power from its additional components. Heat generation is a major problem in computers today.

Perhaps a more fundamental limitation is that the user needs a different video card for each type of display or monitor that the computer is connected to. For example, a computer utilized to produce an image on a 15-inch portrait color monitor requires one type of video card, while one coupled to a 9-inch Black and White screen requires another. Thus, different monitors require matched video cards which ultimately reduce the flexibility afforded the user.

As will be seen, the present invention eliminates the need for a separate video card in a microprocessor-based computer system. It accomplishes this by the use of a video integrated circuit (IC) which may be incorporated directly onto the motherboard of the computer. The invented computer is characterized by one or more banks of system RAM which are shared by both the CPU and the video display circuitry. Because the video display uses the standard system RAM, which is completely accessible to the CPU, many different displays are supported without "wasting" any portion of the memory not used by the display. Hence, any portion of the system memory not being used by the video display circuitry may be used by the CPU to store instructions or perform calculations.

In a sense, the present invention is a form of direct memory access (DMA) in which the video IC reads information from the system RAM without any CPU intervention. The more usual way to implement DMA is to arbitrate the entire data bus—essentially disconnecting the CPU from the bus during a video display cycle. In contrast, according to the present invention the CPU can continue to work from its internal cache, external cache, ROM, I/O devices, NUBUS and certain banks of RAM, while the video IC is accessing video data from another bank of system RAM.

Further, because the present invention eliminates the need to communicate across a slower bus to a video card, system performance is ultimately enhanced.

SUMMARY OF THE INVENTION

The present invention covers a computer which provides a video signal for display. The computer has a central processing unit (CPU) which executes a program to provide video data for the display. The display itself is organized as a matrix of pixel elements, each pixel element being represented by a certain number of bits of video data stored within a random-access memory in the system memory of the computer.

A video integrated circuit is coupled to the system RAM to provide N-bits of video data per pixel to the display at a dot clock rate consistent with the requirements of the display device (e.g., monitor). This video circuit, rather than having its own internal video RAM (VRAM), shares the system memory (i.e., system RAM) with the CPU. A memory controller arbitrates access to the RAM between the CPU and the video circuit in a manner that denies access to the RAM by the CPU whenever the video circuit is reading video data from the RAM.

In one embodiment, the RAM comprises first and second banks of memory. Both banks are coupled to a CPU along the CPU data bus. However, the first bank of RAM can be decoupled from the CPU data bus by a bus buffer controlled by the memory controller. The first bank of RAM is decoupled from the CPU whenever the video circuit signals the memory controller that it wants to read video data.

In the preferred embodiment, the video circuit includes a video first-in-first-out memory (FIFO) which is capable of storing sixteen 32-bit words. During operation, the first eight words of the FIFO receive video data from the first bank of RAM while the second eight words shift out video data to the display circuitry in N-bit chunks. The second eight words then receive data after they are emptied, while the first eight words begin shifting out their data, and so on, alternating back and forth. The FIFO and memory control are optimized so that data may be transferred (after initial access) at a rate of about two clocks per long word, whereas prior art approaches generally required five clock access per one long word.

BRIEF DESCRIPTION OF THE DRAWINGS

The present invention will be understood more fully from the detailed description given below and from the accompanying drawings of the preferred embodiment of the invention, which, however should not be taken to limit the invention to the specific embodiment but are for explanation and understanding only.

DESCRIPTION OF THE PREFERRED EMBODIMENT(S)

A computer utilizing a specialized video integrated circuit (IC) for displaying video data is described. The IC is capable of reading information from the system RAM without any CPU intervention and without disconnecting the CPU from the CPU data bus. In the following description, numerous specific details are set forth such as clock frequencies, register sizes, bit designations, etc., in order to provide a thorough understanding of the present invention. It will be obvious, however, to one skilled in the art, that the present invention may be practiced without these specific details. In other instances, well-known circuits have been set forth in block diagram form to avoid unnecessarily obscuring the present invention.

Although the present invention is described in its preferred embodiment in the Macintosh IIci computer, manufactured by Apple Computer, it should be understood, of course, that the invention could be practiced in other computers and that numerous modifications may be made without departing from the spirit and scope of the present invention.

Figure 1:
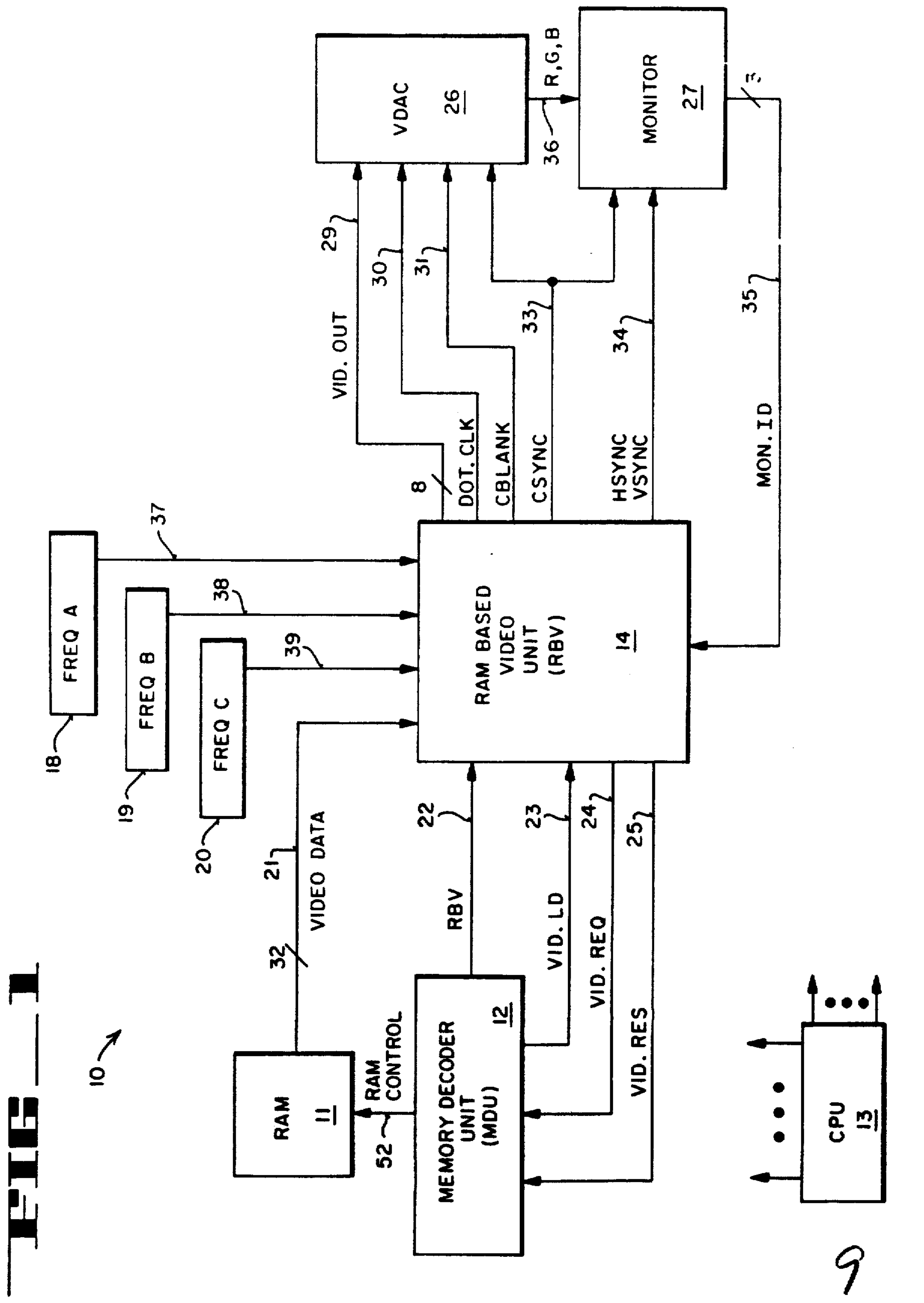
FIG. 1 is a generalized block diagram of the computer which is the subject matter of the present invention.

Referring to FIG. 1, a generalized block diagram of the currently preferred embodiment of the present invention is shown. Computer system 10 comprises a RAM-based video unit (RBV) 14 which provides video display signals for a variety of display monitors. RBV 14 comprises two basic parts: a video portion providing sync signals and data for different types of monitors (in the preferred embodiment, RBV circuit supports four different types of monitors), and a portion that emulates a versatile interface adaptor (VIA).

The VIA portion contains a plurality of 8-bit registers for control of miscellaneous inputs and outputs, video control, RBV chip-testing modes, and interrupt handling. The CPU 13 communicates with these registers over an 8-bit bi-directional data bus that is separate from the 32-bit RAM data bus used by the video portion. This allows access to the registers, independent of video-portion activity on the separate RAM data bus. For the most part, the VIA portion of the RBV is unessential to the understanding of the present invention. Therefore, discussion of the VIA portion will be confined to those elements which aid in the comprehension of the subject invention.

RBV unit 14 is preferably manufactured as an integrated circuit (IC) using a metal-oxide-semiconductor (MOS) process; in particular, complimentary metal-oxide-semiconductor technology (CMOS).

RBV 14 operates in conjunction with memory decode unit (MDU) 12 and random access memory (RAM) 11. MDU 12 functions as a memory controller, arbitrating access to RAM 11 by RBV 14. MDU 12 is designed to provide a compatible interface between CPU 13, RAM 11, ROM 47 and I/O devices 45 (see FIG. 2). In the currently preferred embodiment, CPU 13 is a MC68030 microprocessor manufactured by Motorola Corporation.

RAM 11 has at least one bank of dynamic memory (DRAM) and is coupled to RBV 14 along 32-bit bus line 21. Preferably, RAM 11 has two separate banks of RAM driven directly by MDU 12. MDU 12 is coupled to RAM 11 along control line 52. RBV 14 and MDU 12 communicate with each other along lines 22–25. As will be discussed later, initial access to video data stored in RAM 11 is 5 CPU clocks followed by burst access of two clocks. Internally, MDU 12 comprises a state machine and address multiplexer associated with the control of bank A of RAM 11 in conjunction with video request signals provided by RBV 14.

Frequency timing for dot clock generation is provided by three separate frequency sources 18–20. Each of these sources represents a crystal oscillator circuit operating at a characteristic frequency. Frequency sources 18–20 are coupled to RAM based video unit 14 along lines 37–39, respectively. The use of multiple frequency reference inputs is one way in which the invented computer adapts to different monitor types. Although three are shown, many more may be utilized without detracting from the spirit or scope of the present invention. Alternatively, a single programmable or adjustable clock source may be used instead of separate frequency sources 18-20.

RBV 14 supplies video data to video digital-to-analog converter (VDAC) 26 along bus 29. VDAC 26 comprises a color look up table (CLUT) and a DAC, which, in the preferred embodiment, is the Bt478 device manufactured by Brooktree Corporation. VDAC 26 also receives dot clock, composite blank (CBLANK) and composite video sync (CSYNC) signals from RBV 14 along lines 30, 31, and 33, respectively. These signals vary according to the type of monitor used and are used to organize the video timing of the data on the monitor screen. VDAC 26 provides red, green and blue (RGB) color analog video signals to monitor 27 on line 36. Monitor 27 may also receive video timing horizontal sync (HSYNC) and vertical sync (VSYNC) signals, or a composite sync (CSYNC) signal, from RBV 14. A monitor identification (ID) signal is provided to RBV 14 by monitor 27 along line 35.

As mentioned, four different types of display monitors are supported by the currently preferred embodiment. One of these monitors is driven directly by RBV 14 while the others are driven through VDAC 26. Each monitor type identifies itself by grounding certain pins on the RBV. This automatically selects the appropriate pixel clock and sync timing parameters. The four types of monitors presently supported by the preferred embodiment of the subject invention include: a 9" Macintosh SE (Mac SE), a modified Apple II-GS monitor, a Macintosh II 12" B/W and 13" RGB monitor, and a 15" portrait monitor (B/W or RGB).

Table 1 summarizes the monitor selected by the 3-bit monitor ID pins of line 35. Note that a separate pin is provided (not shown in FIG. 1) on the RBV chip for driving a built-in 9-inch SE monitor.

embodiment, bus buffer 44 is a commercially available 74F245 bus buffer.

One of the key aspects of the present invention is that RBV 14 acts as the functional equivalent of a separate video card while being incorporated onto the motherboard as an integrated circuit. To achieve this functionality, bank A of the system RAM may be selectively decoupled from CPU data bus 50 by bus buffer 44. This allows sole access to bank A by RBV 14 along bank A RAM bus 21. Data stored in bank 43 of the system RAM is used by the RBV to feed a constant stream of video data to display monitor 27 during the live video portion of each horizontal scan line. RBV 14 asks the MDU 12 for data as it is needed; MDU 12 responds by disconnecting bus 21 from CPU data bus 50 and performing an 8-long-word page-mode burst read from bank A RAM 43 to the FIFO 54 located within RBV 14. Banks 43 and 42 are controlled by MDU 12 via RAM control bus 52.

If a video burst is in progress, CPU access to bank 43 is delayed, effectively slowing down CPU 13. This effect varies depending on the size of the monitor and the number of bits per pixel. Note that only accesses to RAM bank A are affected by video. RAM bank B connects directly to CPU data bus 50 so that CPU 13 has full access to this bank at all times, as it does to ROM 47 and I/O devices 45. It is appreciated that the present invention may be performed without bank 42 or, alternatively, with additional RAM banks added on either side of bus buffer 44. Although the present invention would operate correctly without bank 42, the inclusion of bank 42 adds to the overall efficinecy and performance of the computer system by providing a portion of memory dedicated to CPU 13.

The video portion of RBV 14 comprises, in the currently preferred embodiment, a 16×32-bit first-in-first out (FIFO) memory unit 54, which also includes logic to keep the FIFO filled with RAM data and logic to arrange and shift that data out. RBV 14 also comprises

TABLE 1

| SE Pin on RBV | | MON ID3 | MON ID2 | MON ID1 | Monitor Selected |
|---|---|---|---|---|---|
| Mac SE | GND | 0 | 0 | 0 | Unsupported monitor (drives built-in 9" SE monitor) |
| | GND | 0 | 0 | 1 | 15" portrait monitor (B/W) |
| | GND | 0 | 1 | 0 | Modified Apple II-GS monitor |
| | GND | 0 | 1 | 1 | Unsupported monitor (drives built-in 9" SE monitor) |
| | GND | 1 | 0 | 0 | Unsupported monitor (drives built-in 9" SE monitor) |
| | GND | 1 | 0 | 1 | 15" portrait monitor (B/W) |
| | GND | 1 | 1 | 0 | Mac II 12" B/W & 13" RGB |
| | GND | 1 | 1 | 1 | No external monitor (drives built-in 9" SE monitor) |
| All Other CPUs | +5 V | 0 | 0 | 0 | Unsupported monitor (video halted) |
| | +5 V | 0 | 0 | 1 | 15" portrait monitor (B/W) |
| | +5 V | 0 | 1 | 0 | Modified Apple II-GS monitor |
| | +5 V | 0 | 1 | 1 | Unsupported monitor (video halted) |
| | +5 V | 1 | 0 | 0 | Unsupported monitor (video halted) |
| | +5 V | 1 | 0 | 1 | 15" portrait monitor (RGB) |
| | +5 V | 1 | 1 | 0 | Mac II 12" B/W, 13" RGB |
| | +5 V | 1 | 1 | 1 | No external monitor (video halted) |

Figure 2:
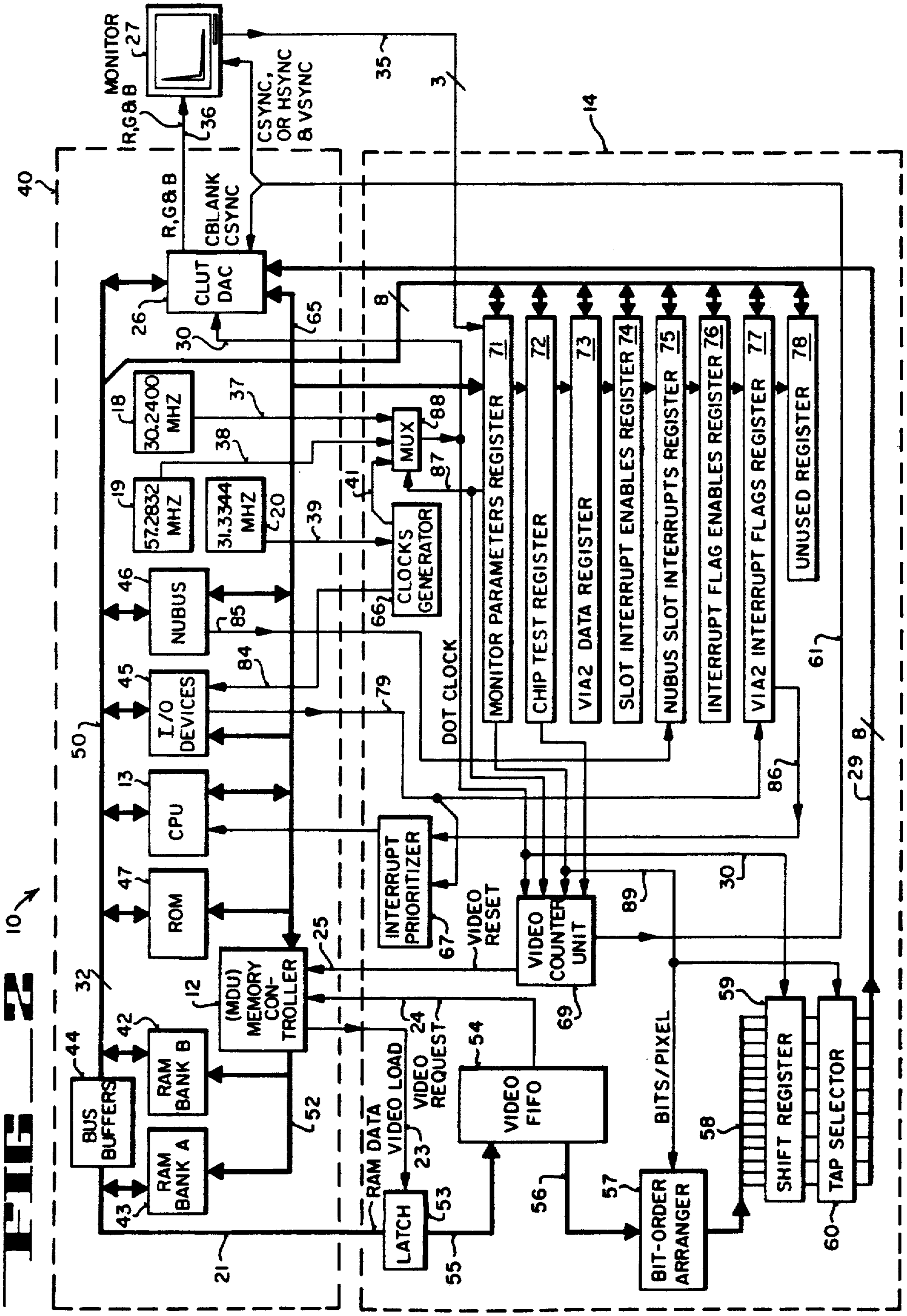
FIG. 2 is a detailed block diagram of the currently preferred embodiment of the present invention.

Referring now to FIG. 2, a detailed block diagram of RBV chip 14 is shown along with connections to computer motherboard 40. CPU 13 is shown coupled to various devices such as ROM 47, I/O devices 45, NUBUS 46 and VDAC 26 along CPU data bus 50 and CPU address bus 65. System memory is shown by two banks of RAM, bank A (43) and bank B (42). Bank B RAM (42) is connected directly to CPU data bus 50, while bus buffer 44 can separate CPU data bus 50 from bank A RAM data bus 21. In the currently preferred latch 53 which is used to strobe video data present on bus 21 into FIFO 54 along load pointer line 55. Video data is unloaded from FIFO 54 on line 56 which is coupled to bit-order arranger 57. Arranger 57 is, in turn, coupled to shift register 59 on line 58. Shift register 59 shifts out the video data arranged by bit-order arranger 57 onto video data bus 29. Tap selector 60 connecting register 59 to bus 29 will be discussed later.

Video FIFO 54 is divided into two halves, each containing eight 32-bit long words. When the last data in a FIFO half has been used (or three long words earlier for a 13-inch monitor at 8 bits per pixel or a 15-inch monitor at 4 bits per pixel), RBV 14 lowers its data request output line 24 (VID.REQ). This video request line instructs MDU 12 to disconnect bank A RAM data bus 21 from CPU data bus 50 by activating bus buffer 44. It also initiates a page-mode burst read of RAM data onto bus 21 as soon as possible. MDU 12 then strobes valid RAM data into RBV 14, using the RBV's video data load input line 23 (VID.LD). Video load input line 23 controls latch 53.

Each trailing edge of a VID.LD pulse latches a 32-bit long word of RAM data into latch 53, stores the latched data in FIFO 54, and then advances the input pointer to the next position in the FIFO. Data is input into video FIFO 54 along line 55 which originates from control latch 53. After the trailing edge of the sixth VID.LD pulse, the RBV raises its video data request line (VID.-REQ) 24. If VID.REQ is high before the trailing edge of the seventh VID.LD pulse, MDU 12 terminates the burst after reading one more long word (the eighth) and strobing it into the RBV. This fills the previously empty half of the FIFO.

Meanwhile, in the other half of the FIFO the other 8 long words of data (loaded during the previous burst read) may be loaded into shift register 59 along bus 58 in 16-bit quantities. After the 8 long words are loaded out of the second half of FIFO 54 (i.e., the second half is empty), the next 8 long words from the first half of the FIFO (which has previously been loaded with video data) are loaded into shift register 59. During this time, the second half of FIFO 54 (emptied during the last series of loads) now receives updated video data from RAM bank A. The second half is filled as described above and the entire process repeats itself—the two halves of FIFO 54 alternately receiving data from RAM 43 and loading data into shift register 59.

Shift register 59 has eight output taps coupled to tap selector 60. The data is advanced through shift register 59 one bit at a time by the dot clock signal appearing on line 30. The eight output taps are located every other bit along the shift register (i.e., every two bits). By using 1, 2, 4 or all 8 of these taps, the data can appear at the video data output bus either one bit at a time (1-bit video), two bits at a time (2-bit video), four bits at a time (4-bit video), or eight bits at a time (8-bit video).

Of course, for the data to appear in the correct order on the output taps, the sixteen bits must have been loaded into shift register 59 in the correct order for the number of bits per pixel selected. This is the function of bit-order arranger 57 which receives the words from FIFO 54 along line 56 and also the bit-per-pixel information present on line 89. For 1-bit-per-pixel video, only the final output tap is used and all 16 bits in the shifter have appeared at that tap after sixteen consecutive dot clocks.

Conversely, for 8-bit video, all eight taps are used and the 16 bits have been sent out to the eight output lines of video data bus 29 after only two dot clocks. In any event, when all 16 bits have been sent out to video data bus 29, the next 16 bits are loaded into shifter 59 from FIFO 54 and the FIFO's output pointer is advanced. This eventually empties that half of the FIFO. The empty half of FIFO 54 must thereafter be filled by another 8-long-word burst of RAM data as described previously.

Referring now to FIGS. 5*a* through 5*d*, bit orderings within shift register 59 are shown for 1 bit, 2 bits, 4 bits and 8 bits per pixel, respectively. As is clearly seen, for 1-bit-per-pixel video the bit ordering begins at zero and continues sequentially up to bit 15 which is located at tap zero. Thus, for 1-bit video the data is loaded or advanced sequentially on one of the eight lines in output data bus 29. The other seven lines in that bus are driven high.

For 2-bit video, the odd numbered bits are located in the left half of the shift register (i.e., odd bits 1-15) ending at tap 1, while the even numbered bits (i.e., even bits 0-14) are loaded in the right half of the shift register ending at tap 0. Again, the output data bus lines connected to the unused taps are driven high.

For 4-bit video, the bit ordering is even more convoluted. As is shown, the bit ordering is such that bits 12, 8, 4 and 0 are shifted out of tap 0, bits 14, 10, 6 and 2 are shifted out of tap 2, bits 13, 9, 5 and 1 are shifted out of tap 1 and bits 15, 11, 7 and 3, in that order, are shifted out of tap 3.

For 8-bit video, all eight taps are employed in the following manner: tap 0 shifts bits 8 and 0, tap 1 shifts bits 9 and 1, tap 2 shifts bits 10 and 2, tap 3 shifts bits 11 and 3, tap 4 shifts bits 12 and 4, tap 5 shifts bits 13 and 5, tap 6 shifts bits 14 and 6 and tap 7 shifts bits 15 and 7, in that order. For 8-bit video all 16 bits have been shifted out after two dot-clock periods.

Each of the taps shown in FIGS. 5*a* through 5*d* are coupled via tap selector 60 to video data output bus 29 (e.g., VID.OUT) such that the most significant bit corresponds to VID.OUT7 and the least significant bit corresponds to VID.OUT0. For example for 8-bit video, each long word is shifted out such that bit 31 appears at VID.OUT7 at the same time bit 30 appears at VID.OUT6, bit 29 at VID.OUT5, bit 28 at VID.OUT4, bit 27 at VID.OUT3, bit 26 at VID.OUT2, bit 25 at VID.OUT1 and bit 24 at VID.OUT0, and so on. 1-bit video appears on output pin VID.OUT0, while pins VID.OUT1 through 7 are held high (they appear as ones). Each long-word from RAM is shifted out on VID.OUT0 starting with bit 31 and continuing straight through to bit 0, as the monitor beam proceeds from left to right.

As shown in FIG. 2, tap selector 60 is coupled to line 89 to receive the number of bits per pixel to be output onto video data bus 29. Once each video frame—at the end of the vertical sync pulse—RBV 14 lowers its video reset (VID.RES) output line 25 to reset the MDU's video address counter. Then, just before the first line of live video, the RBV does two 8-long-word requests so that it starts out with video FIFO 54 completely full. Afterwards, the process continues as described above—where words are shifted out at the same time new video data words are shifted in.

RBV 14 lowers its VID.REQ line 24 when it is ready to accept 8 long words of input data from RAM 43. From then on, it waits for the memory controller 12 to strobe data in. Data is strobed in by memory controller 12 using the VID.LD line 23. The RBV will wait indefinitely for the video data to arrive (though it will eventually begin shifting out the FIFO's old data again, if it waits long enough). It will accept any number of strobed-in long words even though that data may eventually begin overriding data that has not been shifted out yet if too many long-words are strobed in.

After the sixth VID.LD strobe, RBV 14 raises VID.-REQ line 24. This occurs even if the next request for 8 long words is already pending. If VID.REQ line 24 has been raised before the end of the seventh VID.LD strobe, MDU 12 strobes one more long word (the eighth) into the RBV unit and then waits for the next VID.REQ signal (which may occur any time after the end of the seventh VID.LD strobe).

RBV unit 14 contains no information about screen mapping or video addresses. It simply assumes that the memory controller will give it correct data when requested, most often in 8-long-word groups. At the end of each vertical sync pulse, RBV 14 lowers its VID.RES line 25 for the time between two horizontal sync pulses. The memory controller unit 12 uses this signal to reset its video address counter back to the beginning of the frame buffer.

Similarly, memory controller unit 12 knows nothing about the video circuitry or any of its parameters. When it senses the VID.REQ line going low it waits until any current bank A RAM cycle is over; then it signals the RAM bus buffers to tri-state, thereby disconnecting bus 21 from CPU data bus 50. Next, it begins a page-mode burst read of the RAM.

Note that only three wires (VID.REQ, VID.LD, and VID.RES) are required for interaction between MDU 12 and RBV 14. RBV 14 does not need to store any information about memory or the MDU. Likewise, MDU 12 has no requirements to know anything about video. Each simply communicates to the other according to the three-wire handshaking scheme described above. This feature greatly simplifies system design as well as the internal architecture of both the MDU and the RBV. It also improves system flexibility. The RBV could be replaced with a different video or other DMA-from-RAM device without affecting the MDU, or the memory addresses and organization could be changed without affecting the RBV, as long as the handshaking scheme is preserved.

MDU 12 signals each long word of the burst read by dropping its VID.LD line low for one CPU clock period. It continues the page-mode burst indefinitely—stopping only one read after it sees the VID.REQ line 24 return to a high state. The addresses that the MDU 12 supplies for the video burst reads start at address $0000 0000 and increment by 1 long word at each VID.LD. This continues indefinitely (using a 24-bit counter within the memory controller) until MDU 12 senses the VID.RES line 25 going low. When VID.RES (Video Reset) is taken low, the counter within MDU 12 is reset to $0000 0000.

Figure 4:
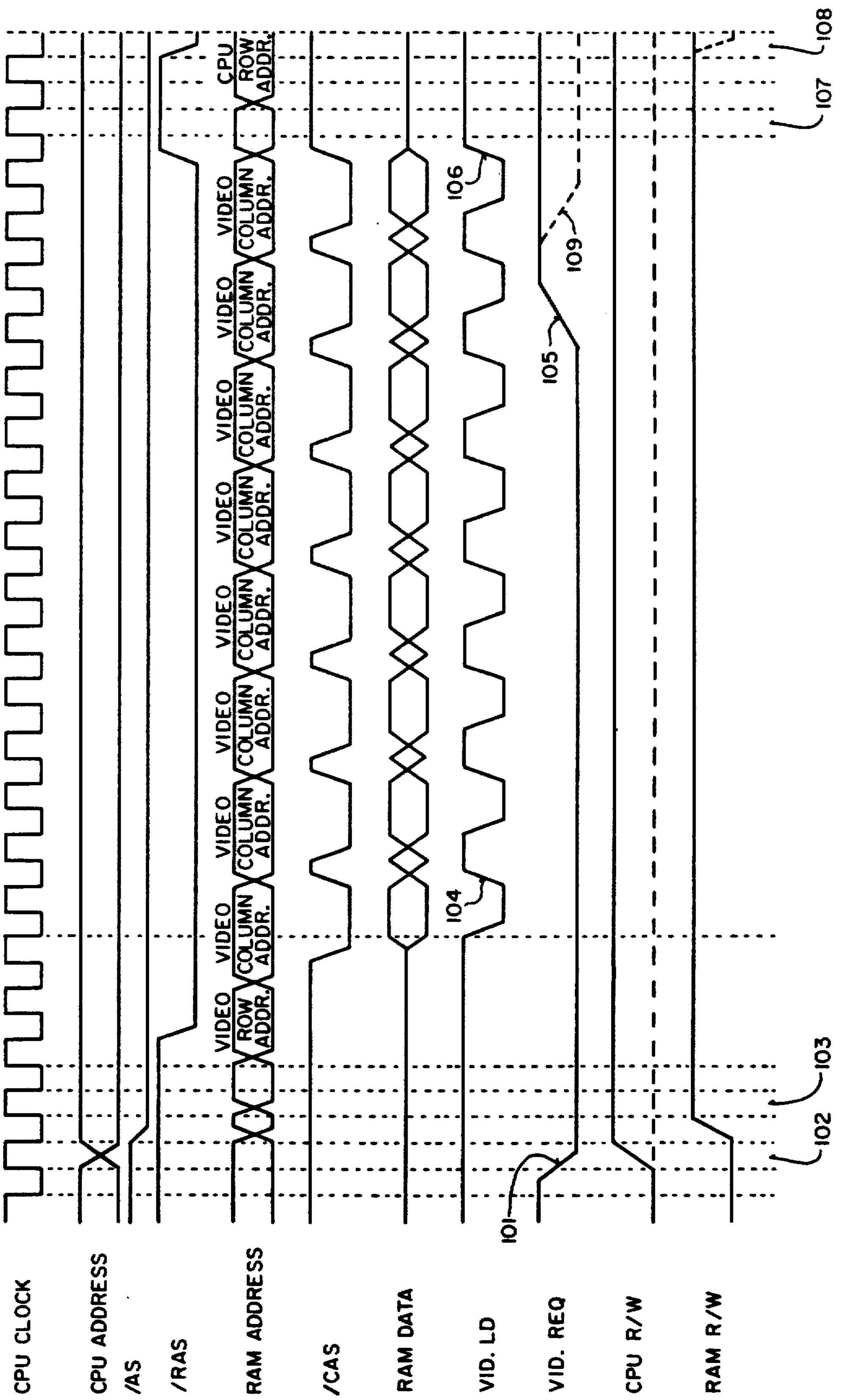
FIG. 4 shows the video timing waveforms for a memory cycle in which video data is transferred from the system RAM to the video FIFO of the video circuitry.
Figure 5A:
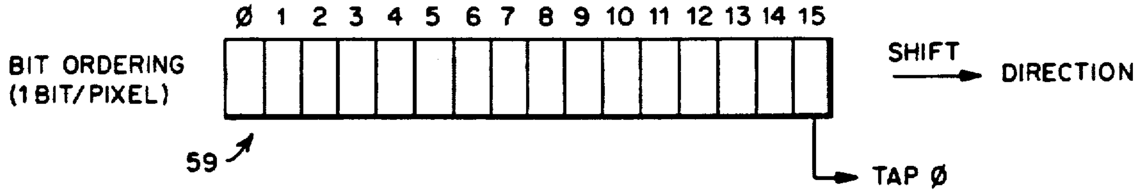
FIG. 5*a* shows the bit ordering of video data in the shift register and the taps used in the currently preferred embodiment for 1-bit-per-pixel video.
Figure 5B:
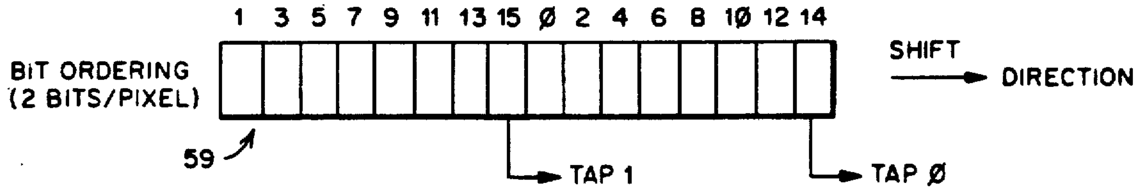
FIG. 5*b* shows the bit ordering of video data in the shift register and the taps used in the currently preferred embodiment for 2-bit-per-pixel video.
Figure 5C:
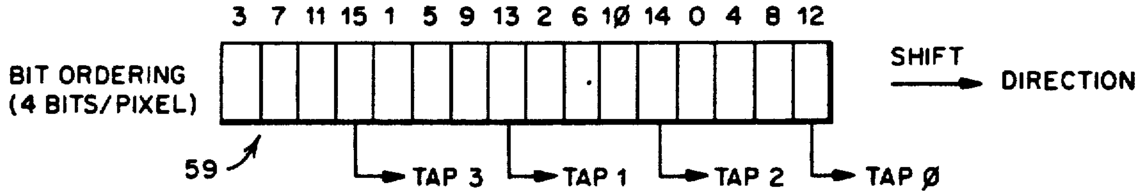
FIG. 5*c* shows the bit ordering of video data in the shift register and the taps used in the currently preferred embodiment for 4-bit-per-pixel video.
Figure 5D:
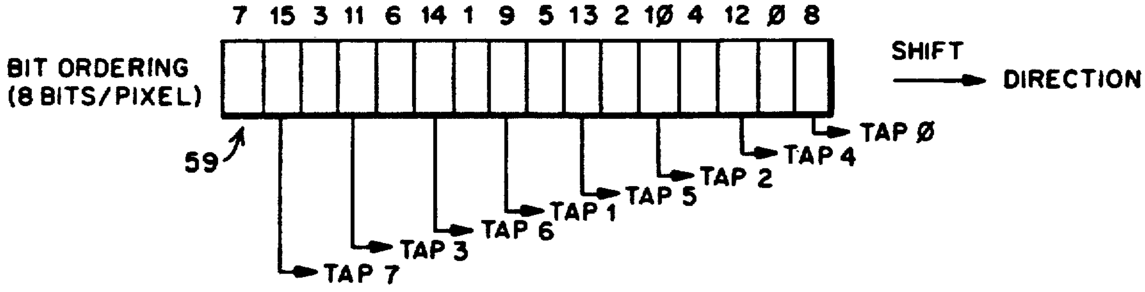
FIG. 5*d* shows the bit ordering of video data in the shift register and the taps used in the currently preferred embodiment for 8-bit-per-pixel video.

Referring now to FIG. 4, a timing diagram showing the interaction between the RBV unit and the MDU's RAM control is given. Transition 101 on the VID.REQ line begins the process of video data transfer from RAM 43 to FIFO 54. Note that if the RAM 43 is engaged in a current RAM cycle with CPU 13, MDU 12 waits until that RAM cycle is over before signalling bus buffer 44 to tri-state.

A new CPU RAM cycle is shown beginning at time 102. However, because VID.REQ line 24 has transitioned low, the CPU cycle is held off for twenty clocks by the 8-long-word video burst. The start of the video read cycle occurs at time 103. A minimum of five clocks after the VID.REQ line transitions low, video data stored in RAM Bank A begins to be strobed into FIFO 54. The first long word of video data is loaded on the positive-going transition 104 of the VID.LD signal. When VID.REQ transitions high at 105 the MDU is alerted at the next positive-going transition of VID.LD to provide one more word of video data. The last word of video data is shown being loaded at transition 106.

The end of the video burst read cycle occurs at time 107. Following that a continuation of the held-off CPU RAM cycle begins at time 108. It should be noted that a new video request can be initiated immediately after MDU 12 detects VID.REQ being brought high at the next positive-going transition of VID.LD. This is shown by the dashed low transition 109 in FIG. 4.

As discussed above, video shift register 59 is sixteen bits long and has taps located every two bits. For 8-bit video, all of the taps are used and each of the sixteen data bits appear at a tap after two pixel clocks. If no new data is loaded it takes fourteen more pixel clocks before ones are shifted out of the final tap. (Ones are shifted in to replace old, shifted out data bits).

When horizontal blanking begins, the video shift register has completed its shifting operations so that all 16 data bits appear at one of the taps in use in the form of sixteen 1-bit pixels, eight 2-bit pixels, four 4-bit pixels, or two 8-bit pixels. Horizontal blanking prevents the loading of new data into the shift register. The shifter, however, which is clocked by the dot clock and therefore is always shifting, continues to shift out old data until it is entirely filled with ones. RBV 14 continues to send out old data for fourteen pixel clocks in 8-bit mode, twelve pixel clocks in 4-bit, eight pixel clocks in 2-bit, or zero pixel clocks in 1-bit mode. From then on, it shifts all ones until it is once again loaded with new data. Since the Macintosh SE uses only 1-bit video, there is no old data to shift out after blanking starts. On other computers, the composite blanking signal (CBLANK), which is provided on line 61 (see FIG. 2) and is input into VDAC 26, prevents any old data from appearing on the screen.

Vertical blanking takes place after horizontal blanking starts and after the FIFO 54 is loaded with one more 8-long-word burst of data from bank 43. Those 8 long words are never loaded into shift register 59, which (after shifting out any old data still in it) continues to shift ones all during vertical blanking. Fairly early into the vertical blanking sequence all pointers are reset and VID.RES is lowered, resetting the MDU's video address counter. Then, about two lines before the end of vertical blanking, FIFO 54 is loaded with 16 long words of new data which replaces any data previously loaded in preparation for the start of live video.

The video sync signals (which include HSYNC, VSYNC, CSYNC and CBLANK) are generated by video counter unit 69. Video counter unit 69 comprises a series of programmable polynomial counters of a type which are well-known in the art for use in generating video timing signals. the video counters of unit 69 are self-configuring in the sense that once provided with the monitor type and the bits-per-pixel requirement, video counter unit 69 can then provide the correct timing signals for the associated display or monitor.

Figure 3:
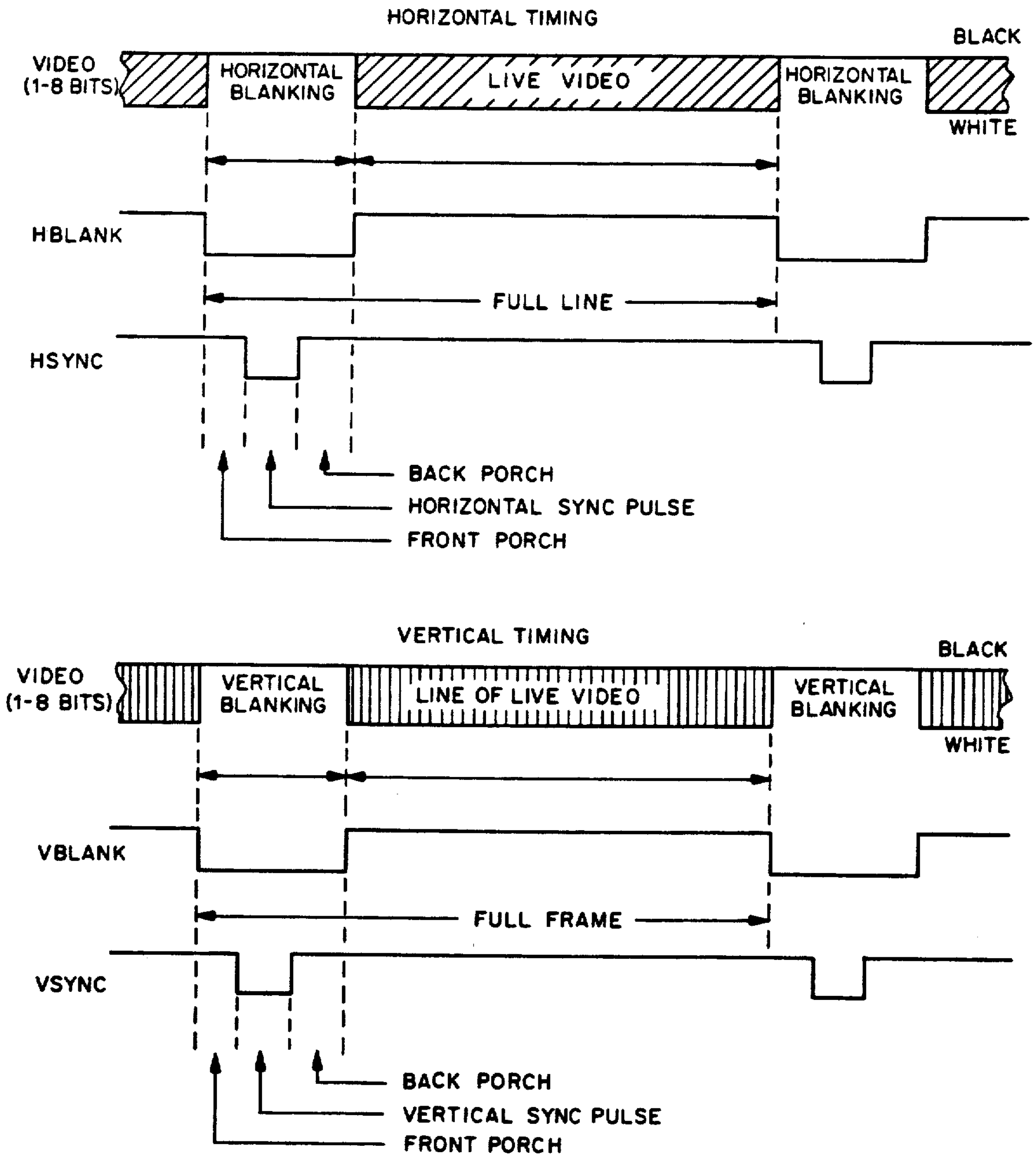
FIG. 3 shows various video timing signals and their associated video timing parameters.

Referring to FIG. 3, standard horizontal and vertical timing waveforms—showing the relationship between the horizontal blanking, live video, horizontal sync, vertical blanking, lines of vertical live video and vertical synchronization signals—are provided. As is known to practitioners in the art, each of the parameters associated with the horizontal and vertical timing are dependent on the type of display or monitor used.

Monitors supported by this video system provide identification (ID) of their type through a digital code present on a set of external lines or pins. In the present invention, monitor 27's ID pins are coupled to monitor parameters register 71 on 3-bit line 35. Monitor type is provided to video counter unit 69 and MUX 88 along line 87. Bit-per-pixel information is provided by register 71 to unit 69 and arranger 57 on line 89.

Software can read the monitor type in register 71, and can read or write the number of bits per pixel in the same register. A decode of the 3-bit monitor ID type selects one of four fixed parameter sets—one set for each monitor supported. These parameter sets are "hardwired" in the chip and provide signals HSYNC, VSYNC, etc. The only programmable parameter is bits-per-pixel.

In an alternative embodiment, register 71 or its equivalent may be fully programmable. This would give the system the capability of setting a large number of display parameters—the only limitation being the size of register 71's internal storage size. In that case, the monitor ID bits would be decoded by software, which would then write into register 71, providing all of the correct parameters for the associated display.

The following table summarizes the relevant timing parameters supplied by the RBV (and illustrated in FIG. 3) for the four types of monitors supported by the currently preferred embodiment of the present invention.

register 71. RBV 14 then selects the appropriate video timing and sync parameters for video counter unit 69. Bit per pixel information is also provided to bit arranger 57 and video counter unit 69 on line 89. Unit 69 includes a plurality of polynomial counters of a variety well-known in the art. Using the decoded monitor type, the RBV sets these counters to produce video timing signals according to Table 2 for the associated monitor.

Monitor type information is also supplied on line 87 to multiplexer 88. Depending on the type of monitor that is connected to the computer system, multiplexer 88 will select one of the three dot clocks supplied either by oscillator 18, 19 or a divide-by-two of the clock from oscillator 20. (corresponding to frequencies 30.2400, 57.2832, and 15.6672 MHz, respectively). The divided clock from oscillator 20 is provided to multiplexer 88 on line 41.

For instance, if the monitor identification code identifies monitor 27 as a modified Apple II-GS RGB display, then MUX 88 will select the corresponding clock signal on line 41, (i.e., 15.6672 MHz) as the dot clock to be supplied on line 30 to VDAC 26, shift register 59 and video counter unit 69. (Clock generator 66 is used to divide frequency reference 20 appearing on line 39 by half to generate the correct dot clock frequency on line 41. Clock generator 66 also provides input/output (I/O) clocking for I/O devices 45).

TABLE 2

| | 9" Mac SE | Modified Apple II-GS RGB | 12" B/W and 13" RGB Mac II | 15" Portrait |
|---|---|---|---|---|
| HBLANK | 192 dots | 128 dots | 224 dots | 192 dots |
| Live Video (Horiz) | 512 | 512 | 640 | 640 |
| Full Line | 704 | 640 | 864 | 832 |
| Front Porch (Horiz) | 14 | 16 | 64 | 32 |
| HSYNC | 288 | 32 | 64 | 80 |
| Back Porch (Horiz) | — | 80 | 96 | 80 |
| VBLANK | 28 lines | 23 lines | 45 lines | 48 lines |
| Live Video (Vert) | 342 | 384 | 480 | 870 |
| Full Frame | 370 | 407 | 525 | 918 |
| Front Porch (Vert) | 0 | 1 | 3 | 3 |
| VSYNC | 4 | 3 | 3 | 3 |
| Back Porch (Vert) | 24 | 19 | 39 | 42 |
| Dot Clock | 15.6672 MHz | 15.6672 MHz | 30.24 MHz | 57.2832 MHz |
| Dot | 63.83 nS | 63.83 nS | 33.07 nS | 17.457 nS |
| Line Rate | 22.25 KHz | 24.48 KHz | 35.0 KHz | 68.85 KHz |
| Frame Rate | 60.15 Hz | 60.15 Hz | 66.67 Hz | 75 Hz |

Figure 6:
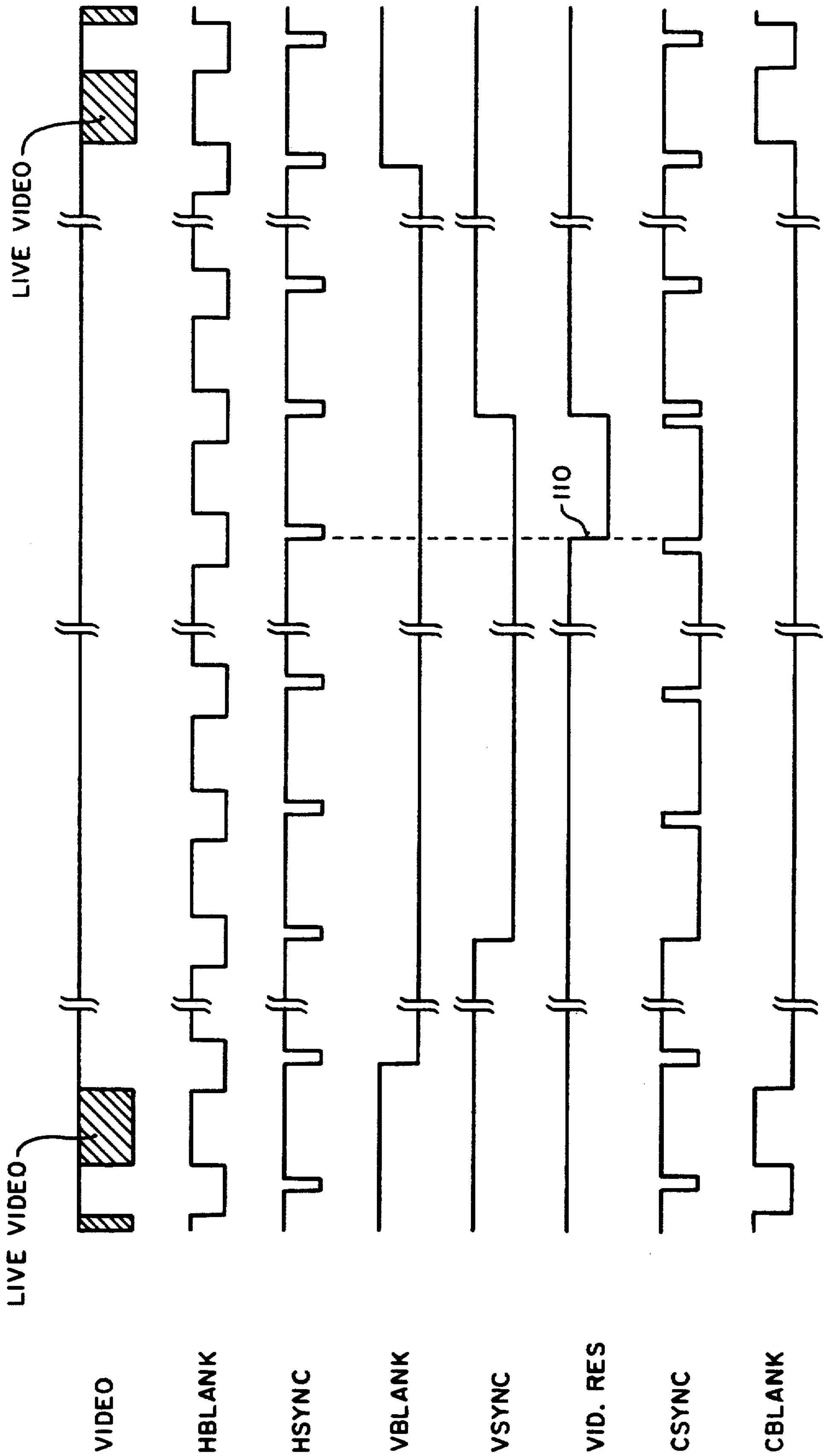
FIG. 6 illustrates the timing relationship between video timing signals and the video reset signal which initiates the beginning of a live video frame.

With reference to FIG. 6, the relative timing of the various sync signals is shown together with the VID.RES reset signal. As can be seen in FIG. 6, between the last two horizontal sync pulse periods in VSYNC, video counter unit 69 lowers VID.RES line 25 to reset memory controller unit 12's address counter. This occurs at transition 110 of FIG. 6. VID.RES is returned high simultaneous with the low-to-high transition of the VSYNC signal. Then, just before the first line of live video, RBV 14 does two 8-long-word requests so that it can start out the frame with a full FIFO.

As discussed above, monitor 27 provides a 3-bit identification code along bus line 35 to monitor parameter Alternatively, if the display identification indicates that the display is a 12-inch black and white or 13-inch RGB Mac II, then frequency reference block 18 (i.e., 30.2400 MHz) on line 37 will be selected by MUX 88. If the 15-inch portrait monitor were being used, MUX 88 would select frequency reference 19 (i.e., 57.2832 MHz) present on line 38.

Table 3 summarizes the video signals driven or halted for the various monitors.

TABLE 3

| SE* | MON ID's | Monitor Selected | Signals Driven | Signals Stopped |
|---|---|---|---|---|
| 0 | 000 | 9" SE | VID.OUT(0-7) | HSYNC = 1 |
| 0 | 100 | | CBLANK | CSYNC = 1 |
| 0 | 011 | | SE.HSYNC | |
| 0 | 111 | | VSYNC | |
| 0 | 001 | 15" Portrait (B/W) | VID.OUT(0-7) | SE.HSYNC = 1 |
| 1 | 001 | | CBLANK | SCYNC = 1 |
| 0 | 101 | 15" Portrait (RGB) | HSYNC | |
| 1 | 101 | | VSYNC | |
| 0 | 010 | Modified II-GS | VID.OUT(0-7) | SE.HSYNC = 1 |
| 1 | 010 | | CBLANK | HSYNC = 1 |
| | | | CSYNC | VSYNC = 1 |
| 0 | 110 | 12" B/W, 13" RGB | VID.OUT(0-7) | SE.HSYNC = 1 |

TABLE 3-continued

| SE* | MON ID's | Monitor Selected | Signals Driven | Signals Stopped |
|---|---|---|---|---|
| 1 | 110 | | CBLANK<br>CSYNC | HSYNC = 1<br>VSYNC = 1 |
| 1 | 000 | Video halted | None | VID.OUT(0-7) = 1's |
| 1 | 100 | | | CBLANK = 0 |
| 1 | 011 | | | CSYNC = 1 |
| 1 | 111 | | | SE.HSYNC = 1<br>HSYNC = 1<br>VSYNC = 1 |

It should be understood that a great variety of monitors, beyond those listed in Table 3, can be made compatible with computer system 10 in accordance with the teachings of the present invention.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. For example, more than two banks of RAM may be used or the size of the FIFO adjusted for particular applications. It is therefore contemplated that the appended claims cover any such alternations or modifications as fall within the scope and spirit of the invention.

Thus, a computer with a RAM-based video integrated circuit has been disclosed. The video circuit functionally replaces a separate video card usually required for video display in a computer while offering speed, performance and efficiency enhancements.

We claim:

1. A computer which provides a video signal adaptable to different types of displays, said computer comprising:

a single central processing unit (CPU) which executes a program to provide video data for a given display;

a random-access memory (RAM) coupled to said CPU, a portion of said RAM storing said video data, wherein said RAM comprises a first bank and a second bank;

a video circuit coupled to said RAM for providing N bits of said video data per pixel to said given display at a predetermined rate, said video circuit sharing access to said RAM with said CPU, said video circuit comprises a first-in-first-out memory (FIFO) for temporarily storing said video data and a shift register coupled to said FIFO, said FIFO being divided into first and second halves, each half alternately receiving said video data from said first bank of said RAM and then loading previously received video data into said shift register, said shift register transferring N bits of said previously received video data per pixel to said given display at said predetermined rate;

a memory controller means for arbitrating access to said RAM by said CPU and said video circuit, said memory controller means assigning accesses to said RAM depending upon the particular video demands of said given display in a manner which optimizes the efficiency of said RAM, wherein said CPU is denied access to said RAM whenever said video circuit accesses said RAM;

a buffer means controlled by said memory controller means for decoupling said CPU from said first bank whenever said video circuit is accessing said first bank, said CPU retaining access to said second bank whenever said CPU is decoupled from said first bank;

wherein said CPU, RAM, video circuit, memory controller means, and buffer means are housed on a single electronic circuit board.

2. The computer of claim 1 wherein said first and second halves of said FIFO are each capable of storing eight 32-bit words.

3. The computer of claim 2 wherein said video data is strobed alternatively into said first and second halves of said FIFO during a burst read cycle of said first bank of said RAM.

4. The computer according to claim 1 wherein said video circuit further comprises a bit-order arranging means coupled between said FIFO and said shift register for arranging the order of said video data as it is loaded from said FIFO into said shift register, said bit order depending on the value of N such that N bits of said video data per pixel are shifted out by said shift register at said predetermined rate, said video data being sequentially coupled to said display in a sequential order.

5. The computer of claim 4 wherein said video circuit further comprises selector means for outputting selected bit positions of said shift register to said given display, said selector means comprising a plurality of taps connected to said shift register at alternate bit positions.

6. The computer of claim 5 wherein said shift register is sixteen bits long and said bit order is:

0, 1, 2, 3, 4, 5, 6, 7, 8, 9, 10, 11, 12, 13, 14, 15 for N=1;
1, 3, 5, 7, 9, 11, 13, 15, 0, 2, 4, 6, 8, 10, 12, 14 for N=2;
3, 7, 11, 15, 1, 5, 9, 13, 2, 6, 10, 14, 0, 4, 8, 12 for N=4;
7, 15, 3, 11, 6, 14, 1, 9, 5, 13, 2, 10, 4, 12, 0, 8 for N=8.

7. A computer which provides a video signal adaptable to different types of displays, said computer comprising:

a central processing unit (CPU);

first and second banks of random-access memory (RAM), each storing video data;

a data bus coupling said first and second banks and said CPU;

a video integrated circuit (IC) coupled to said first bank along said data bus for providing N bits of said video data per pixel to a predetermined type of display for display thereon, said video IC including a first-in-first-out memory (FIFO) for temporarily storing said video data and a shift register coupled to said FIFO for shifting out said temporarily stored video data at a dot clock rate;

a buffer means for decoupling said CPU from said first bank;

a memory controller means for arbitrating access to said first bank by said CPU and said video IC by controlling said buffer means, said memory controller means assigning accesses to said first bank depending upon the particular video demands of said predetermined type of display, thereby optimizing the efficiency of said RAM, such that whenever said video circuit accesses said first bank to provide said video data to said predetermined type of display, said CPU is denied access to said first bank while retaining access to said second bank.

8. The computer of claim 7 wherein each recited element of claim 11 is housed on a single electronic circuit board.

9. The computer according to claim 8 wherein said FIFO is divided into first and second halves, each half alternately receiving said video data from said first bank and then loading previously received video data into said shift register for subsequent output to said predetermined type of display at said dot clock rate.

10. The computer according to claim 9 wherein said video circuit further comprises a bit-order arranging means coupled between said FIFO and said shift register for arranging the bit order of said video data as it is loaded from said FIFO into said shift register, said order depending on the value of N, N bits of said video data per pixel being shifted out by said shift register at said dot clock rate, said video data being sequentially coupled to said predetermined type of display.

11. The computer of claim 10 wherein said video circuit further comprises selector means for outputting selected bit positions of said shift register to said predetermined type of display, said selector means comprising a plurality of taps connected to said shift register at alternate bit positions.

12. The computer of claim 11 wherein said shift register is sixteen bits long and said bit order is:

0, 1, 2, 3, 4, 5, 6, 7, 8, 9, 10, 11, 12, 13, 14, 15 for N=1;
1, 3, 5, 7, 9, 11, 13, 15, 0, 2, 4, 6, 8, 10, 12, 14 for N=2;
3, 7, 11, 15, 1, 5, 9, 13, 2, 6, 10, 14, 0, 4, 8, 12 for N=4;
7, 15, 3, 11, 6, 14, 1, 9, 5, 13, 2, 10, 4, 12, 0, 8 for N=8.

13. A computer which provides a video signal adaptable to different types of displays, said computer comprising:

a central processing unit (CPU);

a random-access memory (RAM) having a first bank and a second bank, at least a portion of said first bank storing video data:

a video integrated circuit (IC) coupled to said first bank, said IC providing N bits of said video data per pixel to a certain type of monitor for display thereon, said IC and CPU each sharing access to said first bank, said IC comprises a first-in-first-out memory (FIFO) for temporarily storing said video data and a shift register coupled to said FIFO, said FIFO being divided into first and second halves, each half alternately receiving said video data from said first bank of said RAM and then loading previously received video data into said shift register, said shift register transferring N bits of said previously received video data per pixel to said certain type of monitor at a dot clock frequency:

a video counter means for providing video timing signals to said certain type of monitor, said signals being derived from said dot clock frequency:

a memory controller for arbitrating access to said first bank of said RAM, said memory controller means assigning accesses to said first bank depending upon the particular video demands of said certain type of monitor, thereby optimizing the efficiency of said RAM, such that whenever said IC is accessing said first bank, said CPU is denied access to said first bank and retains access to said second bank:

wherein said CPU, RAM, IC, video counter, and memory controller are housed on a single electronic circuit board.

14. The computer of claim 13 wherein said first and second halves of said FIFO each store eight 32-bit words.

15. The computer of claim 14 wherein said video data is strobed alternatively into said first and second halves of said FIFO during a burst read cycle of said first bank of said RAM.

16. The computer according to claim 15 wherein said video circuit further comprises a bit-order arranging means coupled between said FIFO and said shift register for arranging the bit order of said video data as it is loaded from said FIFO into said shift register, said bit order depending on the value of N, said video data being shifted by said shift register at said dot clock frequency to said certain type of monitor.

17. The computer of claim 16 wherein said video circuit further comprises selector means for outputting N selected bit positions of said shift register to said display, said selector means comprising a plurality of taps connected to said shift register at alternate bit positions.

18. The computer of claim 17 wherein said FIFO is completely filled prior to the display of the first line of live video in a frame.

19. The computer of claim 18 wherein said shift register is sixteen bits long.

* * * * *